(12) United States Patent
Lambert

(10) Patent No.: US 9,016,881 B2
(45) Date of Patent: Apr. 28, 2015

(54) BEAM GUIDE AND METHOD FOR ADJUSTING THE OPENING ANGLE OF A LASER BEAM

(71) Applicant: Trumpf Laser-und Systemtechnik GmbH, Ditzingen (DE)

(72) Inventor: Martin Lambert, Korb (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 133 days.

(21) Appl. No.: 13/834,172

(22) Filed: Mar. 15, 2013

(65) Prior Publication Data
US 2014/0085741 A1    Mar. 27, 2014

(30) Foreign Application Priority Data

Sep. 27, 2012 (DE) .......................... 10 2012 217 520

(51) Int. Cl.
| | |
|---|---|
| G02B 5/10 | (2006.01) |
| G02B 7/182 | (2006.01) |
| G02B 5/08 | (2006.01) |
| G02B 27/09 | (2006.01) |
| H05G 2/00 | (2006.01) |

(52) U.S. Cl.
CPC ............ *G02B 27/0983* (2013.01); *H05G 2/008* (2013.01)

(58) Field of Classification Search
None
See application file for complete search history.

(56) References Cited

U.S. PATENT DOCUMENTS

| | | | |
|---|---|---|---|
| 6,022,114 | A | 2/2000 | Foo |
| 6,512,781 | B1 | 1/2003 | Borstel et al. |
| 7,928,417 | B2 | 4/2011 | Ershov et al. |
| 8,173,985 | B2 | 5/2012 | Bergstedt et al. |
| 2006/0012863 | A1 | 1/2006 | Goelles et al. |
| 2007/0001131 | A1 | 1/2007 | Ershov et al. |
| 2011/0140008 | A1 | 6/2011 | Bergstedt et al. |

FOREIGN PATENT DOCUMENTS

| | | |
|---|---|---|
| DE | 4333801 A1 | 4/1995 |
| DE | 19545857 A1 | 6/1997 |
| DE | 102004034967 A1 | 2/2006 |
| DE | 102005006239 A1 | 8/2006 |
| EP | 1184946 | 3/2002 |
| WO | WO2010059210 A2 | 5/2010 |
| WO | WO2011130327 A1 | 10/2011 |
| WO | WO2012012267 A1 | 1/2012 |
| WO | WO2012050685 A1 | 4/2012 |

OTHER PUBLICATIONS

International Search Report from corresponding PCT Application No. PCT/EP2013/002872, mailed Jan. 8, 2014, 7 pages.

*Primary Examiner* — Jade R Chwasz
(74) *Attorney, Agent, or Firm* — Fish & Richardson P.C.

(57) ABSTRACT

Beam guides for guiding a laser beam from a driver laser device in the direction of a target position for generating extreme ultraviolet ("EUV") radiation are disclosed. The beam guides include a device for increasing or decreasing the beam diameter of the laser beam. The device includes a first off-axis parabolic mirror having a first convex curved reflecting surface and a second off-axis parabolic mirror having a second concave curved reflecting surface. The beam guides also include a moving device arranged to change a distance between the first and the second reflecting surfaces to change the opening angle ($\alpha$), e.g., the convergence or divergence angle, of the laser beam. Methods for adjusting an opening angle ($\alpha$) of a laser beam using such beam guides are also disclosed.

17 Claims, 3 Drawing Sheets

BEAM GUIDE AND METHOD FOR ADJUSTING THE OPENING ANGLE OF A LASER BEAM

TECHNICAL FIELD

The present invention relates to beam guides for guiding a laser beam from a driver laser device in the direction of a target position for generating extreme ultraviolet ("EUV") radiation.

BACKGROUND

A beam guide for an EUV beam generating apparatus having a device for increasing the beam diameter (beam expansion), which in one embodiment has two off-axis parabolic mirrors, is known from US 2011/0140008 A1. The beam guide described therein is used to guide laser radiation that has been produced and amplified in a driver laser system. The beam guide guides the laser beam from the driver laser system to a focusing element or a focusing device that is used to focus the laser beam at the target position. A target materials is provided at the target position and is transformed into a plasma state during irradiation with the laser beam and thereby emits EUV radiation.

During irradiation with the laser beam, a portion of the target material (for example, tin) is typically vaporised and deposited on the optical surfaces of optical elements that are arranged in the vicinity of the target position. This roughens the surface of the optical elements. To counteract this problem, a $CO_2$ laser is generally used as the driver laser. $CO_2$ laser radiation, due to its high wavelength of approximately 10.6 μm, is still reflected by optical elements that have a comparatively rough optical surface caused by such tin deposits. The use of a driver laser in the form of a $CO_2$ laser with specific target materials, for example, tin, also enables a high level of conversion efficiency between the input power of the driver laser and output power of the EUV radiation.

The $CO_2$ laser radiation used to produce EUV radiation has a high radiation power (for example, greater than 1 kW), which typically requires comparatively large beam diameters to prevent the intensity of the laser radiation on the optical surfaces from becoming excessive. In the case of beam expansion of laser radiation with large beam diameters, the use of parabolic/paraboloid mirrors has been found to be advantageous, because when spherical mirrors are used for beam expansion, the spherical aberrations are relatively large due to the large beam diameters. However, when paraboloid mirrors are used, a theoretically error-free imaging is enabled when the mirrors are appropriately orientated with respect to each other. As described in US 2011/0140008 A1, due to the beam expansion or the increase of the beam diameter of the laser beam, for example, by a factor of 3.6, the divergence of the laser beam can be reduced, which has an advantageous effect on the production of the EUV radiation.

SUMMARY

The present invention relates to systems or devices for increasing or decreasing the beam diameter of the laser beam. These devices include a first off-axis parabolic mirror having a first convex curved reflecting surface and a second off-axis parabolic mirror having a second concave curved reflecting surface. The invention also relates to methods for operating such systems and devices to generate EUV radiation more effectively.

In general, the invention provides a beam guide as described herein and including a moving device arranged to change a distance between the first and the second reflecting surfaces to change the opening angle, e.g., the divergence or convergence, of the laser beam.

The inventors have recognised that it is possible, with the devices and methods described herein for increasing (or decreasing) the beam diameter, to selectively influence the divergence (or convergence) of the laser beam by means of a variation of the distance between the reflecting surfaces. The change of the convergence or divergence of the laser beam has a favorable effect on the generation of the EUV radiation at the target position, because the beam path between the device and the target position is very long (generally more than 10 meters).

To ensure that the laser beam also passes through all the optical components in the beam path under changing temperature conditions, which are determined inter alia by the dynamic thermal behaviour of the optical components, using the devices and methods described herein the opening angle, that is to say, the convergence or divergence of the laser beam, can be influenced in a selective manner. The variation of the convergence or divergence of the laser radiation can be carried out when using two off-axis parabolic mirrors by changing the distance of the reflecting surfaces relative to each other, without the imaging errors increasing excessively within the variation range typically required for the present applications. In this instance, it has been found to be favorable that, due to the long beam path, slight changes of the opening angle (on the order of magnitude, for example, of approximately from 10 to 20 mrad) already have a considerable effect on the resultant beam diameter in the region of the target position. To vary the distance, the moving device can act by means of suitable actuators (motors or the like) on the first and/or the second parabolic mirror to change their position relative to each other and consequently change the distance between them.

The moving device is typically configured for moving at least one parabolic mirror from a starting position in which the focal positions of the two parabolic mirrors are aligned. In the starting position, in which the two parabolic mirrors have the same focal position (and in which the axes of symmetry of the parabolic mirrors coincide)—at least theoretically—no imaging errors are produced. In the event of a variation of the distance of the off-axis parabolic mirror from the starting position, the imaging errors increase.

In the starting position, from a laser beam that strikes the first parabolic mirror in a collimated manner, a laser beam that is outgoing in a collimated manner is produced on the second parabolic mirror. When the distance is changed, the beam diameter changes slightly, but in particular the opening angle of the laser beam is influenced in such a manner that, from a collimated laser beam, as produced in the starting position, a slightly convergent or divergent laser beam is formed. Due to the increase of the distance from the starting position, a (slightly) convergent laser beam is typically produced from the laser beam which is outgoing in a collimated manner. When the distance is decreased from the starting position, a laser beam which is outgoing in a (slightly) divergent manner is typically produced.

In certain embodiments, the devices are configured to generate in the starting position an increase or decrease of the beam diameter of between 1.01 and 10.0. To achieve this, the distance between the two reflecting surfaces in the starting position and the curvature of the reflecting surfaces are selected in an appropriate manner.

In some embodiments, the moving device is arranged to shift at least one of the parabolic mirrors along a displacement axis. It is advantageous when the distance is varied for the reflecting surfaces to retain their orientation relative to each other, that is to say, to change the distance between them by shifting, but not rotating the parabolic mirrors. For the shift along the displacement axis, the relevant parabolic mirror is typically supported so as to be linearly movable on guides and is shifted in the displacement direction by means of an actuator, for example, by means of a linear motor.

In certain embodiments, the shift is carried out along a displacement axis on which the focal points of the parabolic mirrors are located, or along a displacement axis on which the common focal position is located in the starting position. The inventors have found that, during displacement along such a displacement axis, the imaging remains free of aberrations over an astonishingly large variation range, so that the convergence/divergence can be varied over a relatively large range (up to approximately from 10 to 20 mrad). The aberrations that occur during the influence of the beam convergence or the beam divergence when an adaptive mirror is used (that is to say, a mirror with variable curvature) are typically substantially larger.

In other embodiments, the moving device is arranged to shift the at least one parabolic mirror over a distance of at least 10 mm, at least 50 mm, or at least 100 mm along the displacement axis. Such a shift is generally sufficient to carry out the increase/decrease of the beam diameter within the desired limits. With a focal length of the second parabolic mirror of approximately 500 mm, a displacement by approximately 50 mm leads, for example, to a convergence change (change of the opening angle) of approximately 5 mrad, a displacement of approximately 100 mm leads to a convergence change of approximately 10 mrad.

In yet other embodiments, the beam guide comprises at least one tiltable and/or displaceable redirection mirror for compensating for a beam offset when the at least one parabolic mirror is displaced. To compensate for the beam offset, it is possible to use two tiltable or displaceable redirection mirrors that are tilted or displaced relative to each other at such angles or over such distances required to compensate for the beam offset of the laser beam caused by the displacement.

In another embodiment, the (at least one) redirection mirror is coupled for movement with the (at least one) parabolic mirror for conjoined displacement. Due to the movement coupling, a common drive of the moving device can be used for the conjoined movement of the parabolic mirror and the redirection mirror so that an additional control operation for coordination or synchronisation of the displacement movement of the parabolic mirror with the movement of the redirection mirror can be avoided. The displacement movement of the redirection mirror does not necessarily have to be carried out along the displacement axis for the parabolic mirror. That is to say, the movement coupling can be configured in such a manner that the redirection mirror is displaced in a direction that deviates from the displacement axis. This can be achieved, for example, by means of a force-coupled movement of the parabolic mirror using suitable (force) guiding.

Preferably, the beam guide is configured to guide a $CO_2$ laser beam. For guiding a $CO_2$ laser beam, i.e., a laser beam with a wavelength of approximately 10.6 μm, reflective optical elements are preferably used. These typically include at least in the region of the surfaces thereof metal materials, for example, copper, to which a highly reflecting coating is applied as is generally known. Transmitting optical elements can also be used to guide $CO_2$ laser radiation beams. However, there are only a small number of materials that are transparent to $CO_2$ laser radiation. One such material is zinc selenide, which can be used, inter alia, for lens production.

Another aspect of the invention relates to methods for adjusting an opening angle (e.g., divergence or convergence) of a laser beam by means of a beam guide as described herein. The methods include adjusting a distance between the first and the second reflecting surfaces of the parabolic mirrors for generating the desired opening angle of the laser beam. As described further herein, by adjusting the distance, the opening angle of the laser beam can be influenced in a selective manner, that is to say, when starting with a collimated laser beam one can generate a (slightly) convergent or divergent laser beam.

In a variation of the methods for generating a convergent outgoing laser beam, the distance between the first and the second reflecting surfaces is increased from the starting position. In this manner, the outgoing laser beam can be produced with a convergence or an opening angle on the order of magnitude of several milliradians. The comparatively small convergence of the laser beam counteracts an expansion of the laser beam along the beam path to the target position.

Other advantages of the invention will be appreciated from the description and the drawings. The features described above and those set out below can also be used individually or together in any combination. The embodiments shown and described are not intended to be understood to be a conclusive listing, but instead are of an exemplary nature to describe the invention.

BRIEF FIGURE DESCRIPTION

DETAILED DESCRIPTION

Figure 1:
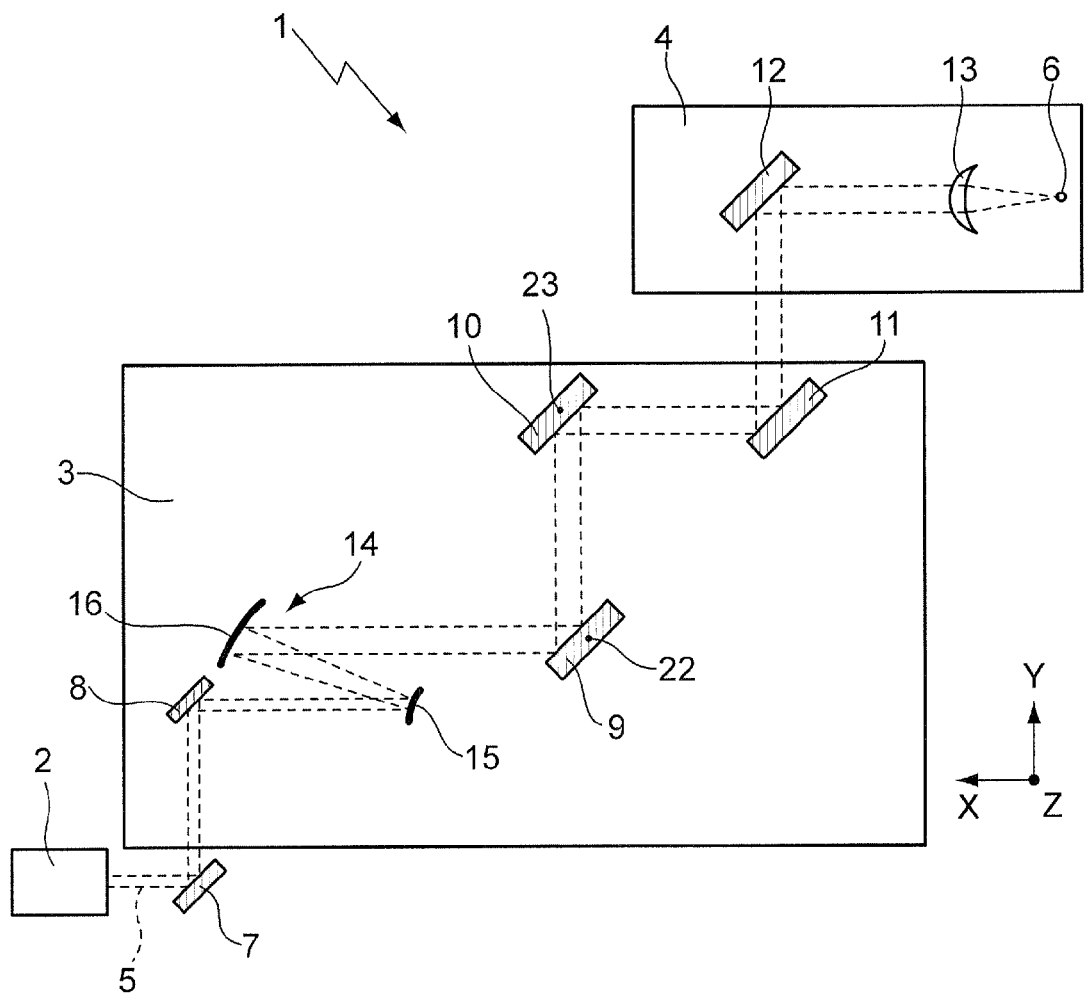
FIG. 1 is a schematic illustration of an EUV beam generating apparatus that has a beam guide and a focusing device for a laser beam.

FIG. 1 shows an EUV beam generating apparatus device 1 that has a driver laser device 2, a beam guide 3, and a focusing device 4 to focus a $CO_2$ laser beam 5 at a target position 6. The EUV beam generating apparatus 1 shown in FIG. 1 substantially corresponds to a structure described in US 2011/0140008 A1, the contents of which is incorporated herein by reference in its entirety. For reasons of clarity, measurement devices for monitoring the beam path of the laser beam 5 have not been illustrated.

The driver laser device 2 includes a $CO_2$ beam source and a plurality of amplifiers for producing a laser beam 5 with a high radiation power (>1 kW). For a detailed description of possible configurations of the driver laser device 2, reference may be made to US 2011/0140008 A1, the content of which is incorporated herein by reference in its entirety. From the driver laser device 2, the laser beam 5 is redirected via a plurality of redirection mirrors 7 to 11 of the beam guide 3 and another redirection mirror 12 of the focusing device 4 onto a focusing lens 13, which focuses the laser beam 5 at the target position 6. At the target position 6, tin is arranged as the target material and is struck by the focused laser beam 5 and converted in this instance into a plasma state, which is used to produce EUV radiation (not illustrated). The target material is supplied to the target position 6 by means of a provision device (not illustrated), which guides the target material along a predetermined path that intersects with the target position 6. For details of the provision of the target material, reference should also be made to US 2011/0140008 A1, the content of which is incorporated herein by reference in its entirety.

In the beam guide 3 there is provided a device 14 for increasing a beam diameter of the laser beam 5, which has a first off-axis parabolic mirror 15 having a first convex curved reflecting surface 15a and a second off-axis parabolic mirror 1 having a second concave curved reflecting surface 16a. The reflecting surfaces 15a, 16a of an off-axis parabolic mirror 15, 16 each form the off-axis segments of a parabola. The term "off-axis" means that the reflecting surfaces 15a, 15b do not contain the rotation axis of the parabola (and consequently also not the apex of the parabola), as shown in FIG. 2a, b, which are detailed illustrations of the device 14 for increasing the beam diameter of the laser beam 5, also abbreviated below as a beam expansion (or beam divergence) device 14.

The collimated laser beam 5 that is discharged from the driver laser device 2, which has a beam diameter d1 on the order of magnitude of approximately from 30 to 50 mm, strikes the first convex reflecting surface 15a and is redirected from there in the direction of the second concave reflecting surface 16a. On the second reflecting surface 16a, the striking divergent laser beam 5 is redirected and collimated so that the beam direction (X direction) of the laser beam 5 exiting from the beam expansion device 14 corresponds to the beam direction (X direction) of the incoming laser beam 5. Of course, this is not necessarily the case, that is to say, the beam direction of the outgoing laser beam 5 may also extend at an angle, for example, at an angle of 90° (that is to say, in the Y direction) relative to the beam direction of the incoming laser beam 5. As can also be seen in FIG. 2a, the laser beam 5, when exiting from the beam expansion device 14, has a beam diameter d2, which corresponds to between approximately 2 and 3 times the beam diameter d1 of the laser beam 5 when entering the beam expansion device 14 (that is to say, d2=2.0 to 3.0× d1).

Figure 2A:
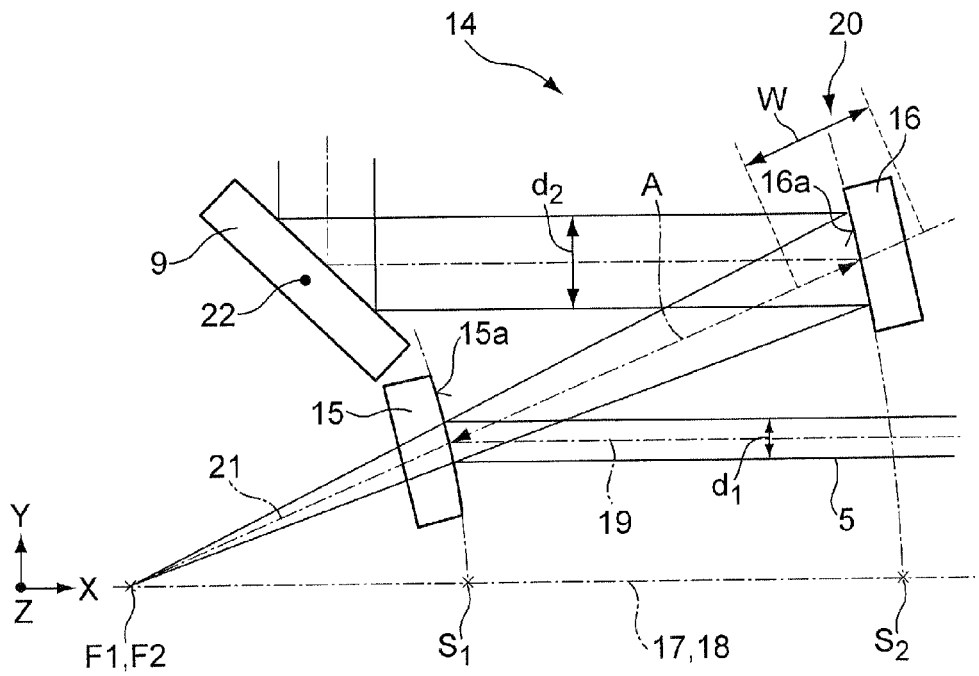
FIG. 2a is a schematic illustration of a device for beam expansion of the laser beam with two off-axis parabolic mirrors in a starting position.

The beam expansion device 14 is shown in FIG. 2a in a starting position in which a rotation axis 17 of the first off-axis parabolic mirror 15 and a rotation axis 18 of the second off-axis parabolic mirror 16 coincide, that is to say, the apexes S1 and S2 of the two off-axis parabolic mirrors 15, 16 are on the common axis of symmetry 17, 18. The distance A between the two parabolic mirrors 15, 16, which is measured along the (folded) beam axis 19 of the laser beam 5, is selected in the starting position in such a manner that the focal positions F1, F2 of the two parabolic mirrors 15, 16 coincide. In this manner, in the case of expansion using the two parabolic mirrors 15, 16 that form a telescope arrangement, (theoretically) aberration-free imaging can be achieved.

To generate the EUV radiation, it is advantageous to make the divergence (or convergence) of the laser beam 5 adjustable. To this end, the beam expansion device 14 has a moving device 20, which is indicated in FIG. 2a by means of a double-headed arrow and which is configured to move the second parabolic mirror 16 along a displacement axis 21 that contains the portion of the laser beam axis 21 located between the two parabolic mirrors 15, 16 and the focal position F1, F2 of the first and second parabolic mirrors 15, 16 in the starting position. The moving device 20 has guiding means (not shown), for example, guiding rails or the like, and an actuator (drive, for example, linear drive) that is coupled to a retention member (not shown) of the second parabolic mirror 16 to move it along the displacement axis 21.

The maximum movement path W of the second parabolic mirror 16 along the displacement axis 21, which determines the maximum variation of the distance A between the mirrors, is approximately 100 mm in the present example with, starting from the rest position illustrated in FIG. 2a, a first half of the movement path (W/2) being able to be used to reduce the distance A and the other half to increase the distance A. In other words, the distance A can be varied using the moving device 20 in the range between A−W/2 and A+W/2. Of course, the division of the variable decrease or increase of the movement path A can also be configured differently than in the manner described above. In particular, the moving device may optionally be configured in such a manner that, starting from the starting position illustrated in FIG. 2a, optionally only a decrease (or only an increase) of the distance A is possible.

Figure 2B:
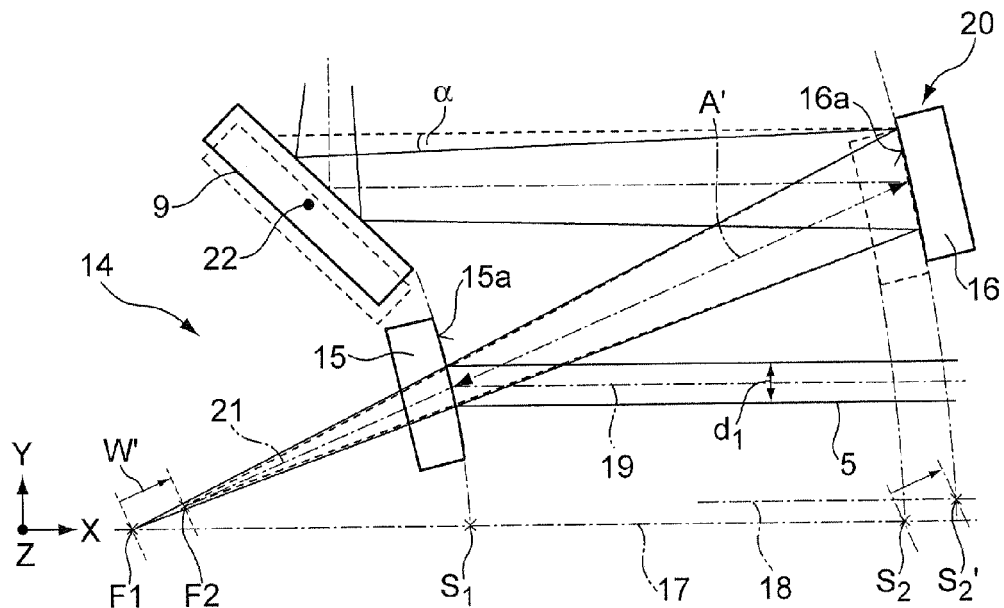
FIG. 2b is a schematic illustration of the device of FIG. 2a, in which the second off-axis parabolic mirror has been shifted from the starting position along a displacement axis.

FIG. 2b shows the beam expansion device 14 in a position in which the second parabolic mirror 16 has been moved by a value W' along the displacement axis 21, whereby there is adjusted between the parabolic mirrors 15, 16 a distance A' that is linked to the distance A in the starting position in the following manner: A'=A+W'. As can also be seen in FIG. 2b, in the position shown, the axes of symmetry 17, 18 of the parabolic mirrors 15, 16 no longer coincide. The focal position F2' of the second parabolic mirror 16 and the apex S2' are also displaced accordingly.

Figure 3:
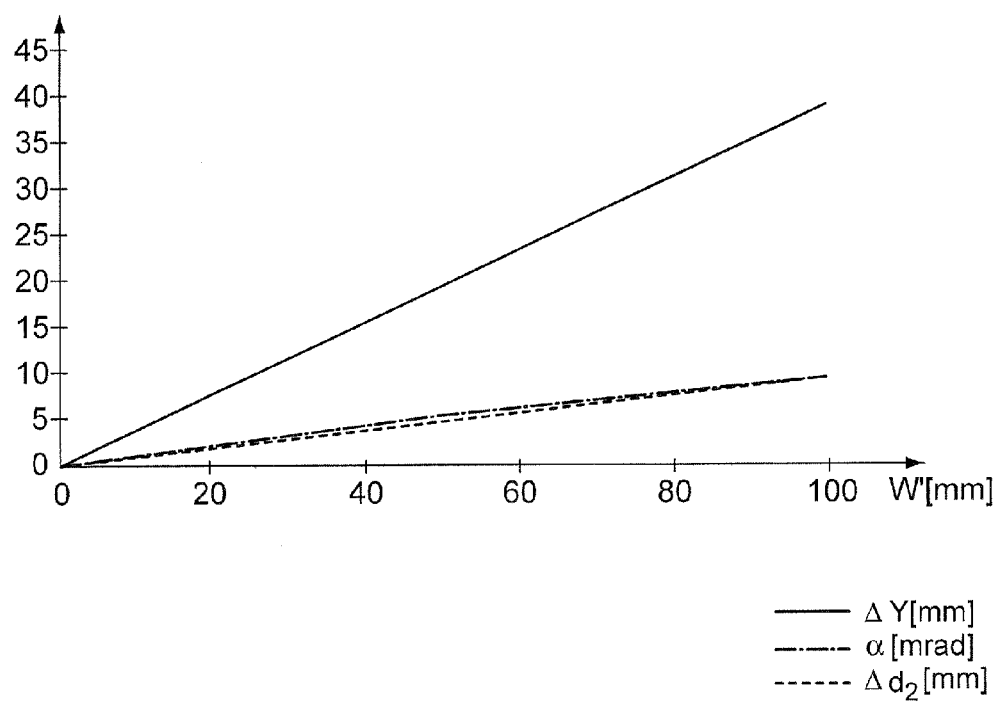
FIG. 3 is a graph that shows the opening angle, the change of the beam offset, and the change of the beam diameter of the discharged laser beam in accordance with the displacement path.

As can be seen in FIG. 3, due to the increased distance A' between the reflecting surfaces 15a, 16a, the laser beam 5 is expanded to a greater extent and, when exiting from the beam expansion device 14 after the second parabolic mirror 16, has a beam diameter that is increased with respect to the beam diameter d2 in the starting position shown in FIG. 2a in accordance with the displacement path W' (=A'−A) by a value $\Delta d_2$. Of course, due to a decrease of the distance A (compared to FIG. 2a), a correspondingly reduced beam diameter can be produced.

As can also be seen in FIG. 3, the increase of the distance between the optical surfaces 15a, 16a from the starting position also brings about a change of the (half) opening angle α of the laser beam 5 with respect to the beam expansion direction of the laser beam 5, that is to say, the discharged laser beam is convergent with an opening angle α in the range of a few milliradians, but which has been illustrated in an exaggeratedly enlarged manner in FIG. 2b for the purposes of illustration. Accordingly, by reducing the distance A between the optical surfaces 15a, 16a, from the starting position, a divergent outgoing laser beam 5 can be produced. In general, by changing the distance, the divergence/convergence of the laser beam 5 can consequently be influenced in a selective manner.

In particular, the divergence/convergence of the laser beam 5 can be adjusted dynamically in accordance with the current situation or status of the EUV beam generating apparatus 1. The present situation or status is produced, on the one hand, by the (quasi-static) positioning conditions and, on the other hand, by the thermal state of the EUV beam generating apparatus 1, which is characterized, inter alia, by the dynamic thermal behavior of the components.

As can be seen from a comparison between FIG. 2a and FIG. 2b and from FIG. 3, the movement of the second parabolic mirror 16 in the displacement direction 21 also leads to a beam offset of the laser beam 5 striking the redirection mirror 9 in the Y direction, by a value ΔY, which is dependent on the displacement path W'. To compensate for this beam offset, the redirection mirror 9 and another redirection mirror 10, which follows in the beam path, can be configured so as to be able to be pivoted about a tilting axis 22, 23 that extends in the Z direction and/or is displaced in the Y direction. The tilting or displacement of the redirection mirrors 9, 10 is mutually adapted in such a manner that the laser beam 5 strikes the following redirection mirror 11 at the desired position (and parallel with the X direction, that is to say, orientated at the correct angle). Of course, the compensation of the beam offset can also be carried out alternatively or additionally using the other redirection mirrors 11, 12 or in another manner so that it is ensured that the laser beam 5 is focused by the focusing lens 13 on the target position 6 as desired.

If the redirection mirror 9 shown in FIG. 2b can be displaced in a linear manner in the Y direction, the redirection mirror 9 and the parabolic mirror 16 are advantageously (mechanically) coupled to each other in terms of movement, i.e., they are moved by a common drive, and typically by the drive or the actuator of the moving device 20. A corresponding guide arrangement brings about a movement of the redirection mirror 9 and the parabolic mirror 16 in the Y direction and a force-coupled movement of the parabolic mirror 16 both in the Y and in the X direction in the displacement direction 21. In this manner, the need for a control device for the co-ordination of two independent movements of the two mirrors 9, 16 can be avoided. If the redirection mirror 9 is supported so as to be displaceable, it does not necessarily also have to be supported so as to be able to be pivoted about the tilting axis 22 (and vice versa).

In the manner described above, the beam diameter of the laser beam 5 can also be reduced. To this end, when the device 14 is installed, only the beam path of the laser beam 5 is intended to be reversed, whereby a (fixed) reduction is adjusted in the starting position. For the adjustment of the divergence/convergence, in this case the first parabolic mirror 15 is arranged so as to be able to be displaced along the displacement axis 21. Of course, both with a device for increasing and with a device for decreasing the beam diameter, optionally both parabolic mirrors 15, 16 can be moved along the displacement axis 21 by means of the moving device. A device for decreasing the beam diameter can be arranged in the beam guide 3 alternatively or in addition to the above-described device 14 for increasing the beam diameter.

Of course, an optical device 14 for increasing or decreasing the beam diameter in combination with the above-described possibility of adjusting the convergence or divergence of the laser beam 5 can advantageously be used not only in beam guides for the generation of EUV laser radiation, but also in beam guides of other optical arrangements, in particular with optical arrangements that have a very long beam path.

The invention claimed is:

1. A beam guide for guiding a laser beam from a laser beam source in the direction of a target position for generating extreme ultraviolet (EUV) radiation, comprising:
a device to increase or decrease the beam diameter (dl) of the laser beam, the device comprising:
a first off-axis parabolic mirror having a first, convex curved reflecting surface; and
a second off-axis parabolic mirror having a second, concave curved reflecting surface; and
a moving device arranged to change a divergence (α) of the laser beam by changing a distance (A, A') between the first and the second reflecting surfaces.

2. The beam guide according to claim 1, wherein motion of the moving device for moving at least one parabolic mirror begins from a starting position in which focal points of the two parabolic mirrors are aligned.

3. The beam guide according to claim 2, wherein a beam widening device is configured to generate from a starting position an increase or decrease of the beam diameter (d1) by a factor of between 1.01 and 10.

4. The beam guide according to claim 1, wherein the moving device is arranged to shift at least one of the parabolic mirrors along a displacement axis.

5. The beam guide according to claim 4, wherein focal points of the parabolic mirrors lie on the displacement axis on which the shift occurs.

6. The beam guide according to claim 4, wherein the moving device is arranged to shift at least one of the parabolic mirrors over a distance of at least 10mm.

7. The beam guide according to claim 4, further comprising at least one mirror that is displaceable or tiltable, or both displaceable and tiltable for compensating for a displacement of the laser beam during displacement of at least one of the parabolic mirrors.

8. The beam guide according to claim 7, wherein the at least one mirror is coupled for movement with the at least one parabolic mirror for conjoined displacement.

9. The beam guide according to claim 1, which is configured to guide a $CO_2$ laser beam.

10. A method of adjusting divergence (α) of a laser beam by means of a beam guide for guiding the laser beam from a laser beam source in the direction of a target position for generating extreme ultraviolet (EUV) radiation, wherein the beam guide comprises:
a device to increase or decrease the beam diameter (dl) of the laser beam, the device comprising:
a first off-axis parabolic mirror having a first, convex curved reflecting surface; and
a second off-axis parabolic mirror having a second, concave curved reflecting surface; and
a moving device arranged to change a divergence (α) of the laser beam by changing a distance (A, A') between the first and the second reflecting surfaces;
the method comprising:
adjusting a distance (A, A') between the first and the second reflecting surfaces of the parabolic mirrors for generating a desired divergence (α) of the laser beam.

11. The method of claim 10, wherein the distance between the first and the second reflecting surfaces is increased from a starting position to generate an outgoing convergent laser beam.

12. The method of claim 10, wherein the distance between the first and the second reflecting surfaces is decreased from a starting position to generate an outgoing divergent laser beam.

13. The method of claim 10, wherein adjusting the distance (A, A') between the first and the second reflecting surfaces of the parabolic mirrors comprises shifting at least one of the parabolic mirrors along a displacement axis.

14. The method of claim 13, wherein focal points of the first and second parabolic mirrors lie on the displacement axis.

15. The method of claim 10, wherein adjusting the distance (A, A') between the first and the second reflecting surfaces of the parabolic mirrors comprise shifting at least one of the parabolic mirrors over a distance of at least 10 mm.

16. The method according to claim 10, further comprising compensating for a displacement of the laser beam during displacement of at least one of the parabolic mirrors.

17. The method according to claim 10, wherein the laser beam is a $CO_2$ laser beam.

* * * * *